W. F. ZIMMERMANN.
HOB CUTTER.
APPLICATION FILED FEB. 18, 1907.

1,003,024.

Patented Sept. 12, 1911.

2 SHEETS—SHEET 1.

WITNESSES:
C. A. Alliston.
Edward J. Black.

INVENTOR
W. F. Zimmermann
BY
Fischer & Sauders
ATTORNEYS

W. F. ZIMMERMANN.
HOB CUTTER.
APPLICATION FILED FEB. 18, 1907.
1,003,024.  Patented Sept. 12, 1911.
2 SHEETS—SHEET 2.
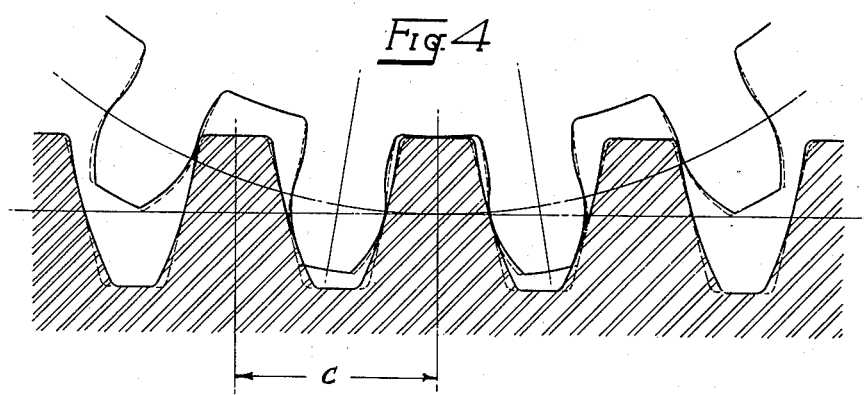
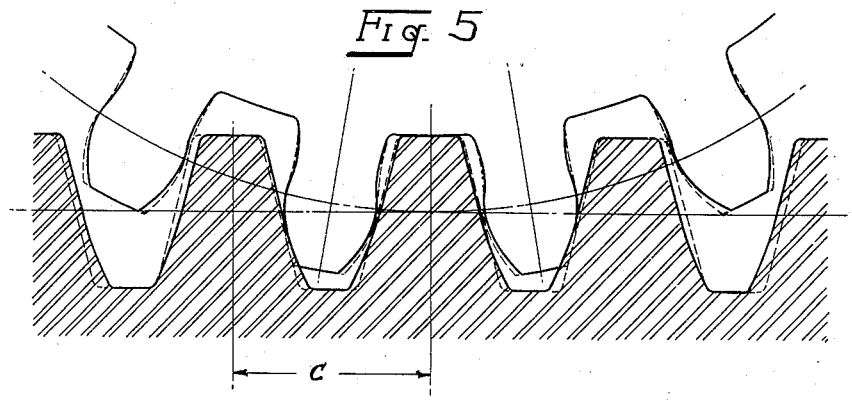
WITNESSES.
B.E. Barnes.
Jos. Cesar
INVENTOR.
William F. Zimmermann.

UNITED STATES PATENT OFFICE.

WILLIAM F. ZIMMERMANN, OF NEWARK, NEW JERSEY.

HOB-CUTTER.

1,003,024. Specification of Letters Patent. Patented Sept. 12, 1911.

Application filed February 18, 1907. Serial No. 357,844.

*To all whom it may concern:*

Be it known that I, WILLIAM F. ZIMMERMANN, a citizen of the United States, and a resident of the city of Newark, county of Essex, and State of New Jersey, have invented certain new and useful Improvements in Hob-Cutters; and I do declare the following to be a full, clear, and exact description of my invention, such as will enable others skilled in the art to which it pertains or to which it is most nearly connected to make, construct, and use the same.

Figure 1:
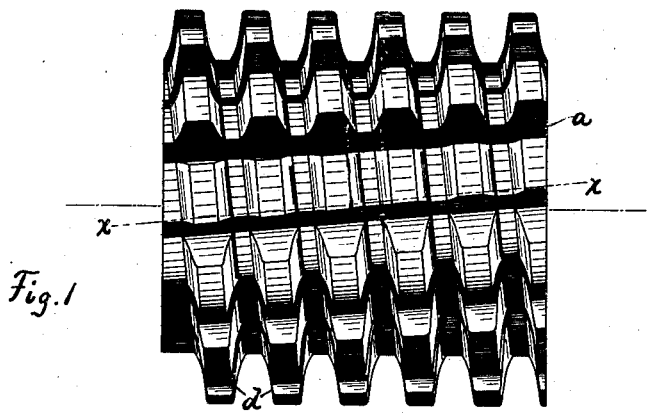
Figure 3:
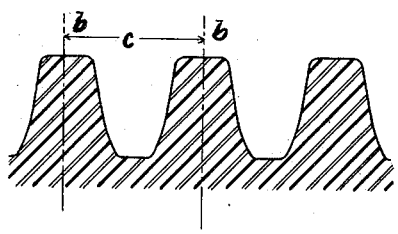
Figure 2:
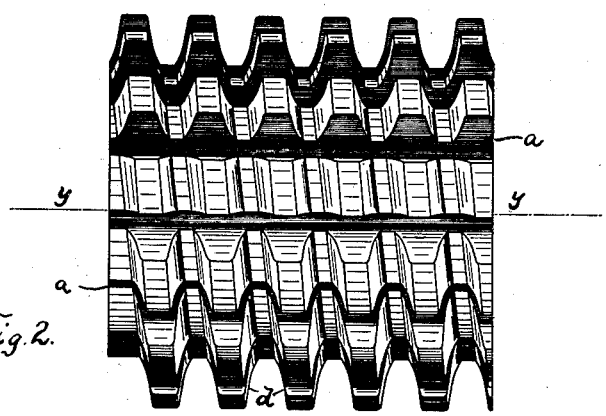

Figure 1 is a side elevation of a helical cutter embodying the invention, with the cutting edges in a plane normal to the helices. Fig. 2 is a similar elevation, but with the cutting edges in a plane parallel to the axes of the cutter. Fig. 3 is an enlarged cross section of the teeth of the cutters on the line $x\ x$ of Fig. 1 or on the line $y\ y$ of Fig. 2. Fig. 4 is a sectional view illustrating a helical cutter with concave cutting edges in connection with a series of resulting gear teeth, and also showing a dotted section of a theoretically correct cutter and the teeth resulting therefrom. Fig. 5 is a similar view illustrating a helical cutter with concave cutting edges, together with a shortened pitch, and also illustrating the difference between a theoretical tooth curve and the resultant tooth curve obtained by the modified cutter.

It is well known that gears when cut theoretically correct with a straight side rack tool, produce an objectionable humming noise at high speed. This may be explained in the following manner. When the teeth of wheels are correctly constructed, that is, in accordance with the theory of gear cutting, so as to produce absolutely continuous motion, it may be readily shown that when the point of contact between two intermeshing teeth is substantially in the line of centers, the adjacent teeth are out of contact and as the two contacting teeth advance, there is a sensible space of time when there is a single pair of teeth in contact and another sensible space of time when two pairs are in contact. When the first pair recedes and the second pair approaches, it leaves only the second pair in contact, thus throwing the entire load upon that pair, until the next pair approaches in contact when the strains are again divided between the two pairs. These sudden changes of strains from full load to half load cause a series of shocks, which at high speed, produce the humming noise heretofore referred to. I have discovered that by deviating slightly from the theoretically correct rack tooth, as for instance, curving the cutting edges or shortening the pitch or both, I am able to completely overcome this humming noise and produce practically silent running spur gears. The result of this modification to the theoretical rack tooth is such that the points of the gear teeth are slightly relieved and the bases under cut, thereby forming a curve which will be of such a character that when two mating gears have their teeth in contact, the load of the receding pair of teeth is gradually diminished and simultaneously the pressure on the approaching pair is gradually increasing so that there is no sudden transition from full load to half load and from half load to full load between any successive pairs of teeth, and I thus eliminate this series of shocks, which as I have stated, is entirely due to sudden changes of pressure.

To enable a better understanding of this invention, the meaning of the terms "theoretical rack tooth" and "the theoretical pitch of a rack tooth" as used in the claims, will be explained. A theoretical rack tooth is a tooth formed similar to a truncated wedge with straight sides, and is the base of the involute system of gear tooth curves. The theoretical pitch of a rack tooth is the distance between the center of two consecutive teeth measured on the pitch line. In measuring the pitch of a rack tooth, the same is always measured on a straight line, whereas the pitch of a gear is measured on a curved line. A rack, however, is merely a gear with an infinite radius. The pitch of a gear is determined and fixed by the number of teeth in the pitch circle of the gear. To find the pitch of a gear, the product of the pitch circle by the factor 3.14159 is divided by the number of teeth in the gear. The pitch thus found would be known as the circular pitch of the gear and is equal to the arc subtended at the pitch line by the angle formed at the center in bisecting two adjacent teeth. This circular pitch rack when rectified, would be the pitch of the rack teeth and would then be known as the linear pitch of the rack.

In Fig. 1 I have shown a hob cutter for use in cutting the teeth of gear wheels in which the slots $a$ are normal to the helix. As illustrated in Fig. 3, which shows a cross-section of the teeth, it will be noted that the contour of the tooth is symmetrical with respect to its axis $b$. This style of cutter may be formed either upon a lathe or upon a milling machine. The usual method of forming a hob cutter upon a lathe results in a tooth upon the cutter which is not symmetrical in the plane normal to the helix and this for the reason that the cutting edges of the tool used in cutting the hob are made symmetrical in a plane passing through the axis of the hob; or, in other words, the cutting edges of a lathe tool are symmetrical in the plane of its movement when forming a hob. This results in producing a cutter with teeth which are not symmetrical in the plane normal to the helix, so that when in use with this normal plane parallel to the face of the gear to be cut, the sides of the teeth do not conform to the correct shape of the tooth to be cut in the spur gear wheel, resulting in producing unsymmetrical sides in the teeth of the finished blank. The method which I have just described, is the ordinary method of producing hobs of this character. I obviate this difficulty by placing the tool with which the helical cutter is formed, with the plane of its cutting edge at an angle with the axis of the cutter, equal to the angle of the helix, or in other words, the plane of the cutting edge of the tool lies either in the plane normal to the helix or in a plane parallel to this normal. It will thus be noted that the normal pitch $c$ of the helix upon the hob cutter so formed is less than the usual linear pitch given to cutters of this type. In using a cutter formed as I have described to cut spur gears, it will be found that when set at an angle equal to the angle of the helix, the shapes of the teeth will not be foreshortened by reason of the unsymmetrical sides, as would be the case if the tool used in cutting the hob were placed in a plane parallel with the axis of the hob. When a hob of this character is cut upon a lathe, such lathe must also be geared up for a longer lead than that which is given by calculation across the normal of the helix, so that when placing the cutter at an angle as stated above in cutting spur gears, the actual lead will be at right angles to the face of the spur gear being cut; or in other words, the gearing up of the lathe must be equal to the linear pitch of the helical cutter and not to the normal pitch. If the helical or hob cutter is formed in a milling machine, all of these points are taken care of, because of the method of producing the cutter, for under such circumstances the milling cutter is placed at an angle with the axis of the cutter blank, equal to the angle of the helix. In using a cutter of this character to cut spur gears, as I have stated above, it is necessary to set the axis of the cutter in the cutter carriage at an angle with the horizontal equal to the angle of normal to the helix. Under certain conditions this is objectionable for the reason that the machine must be accurately set, and such angle be accurately gaged for each cutter.

In Fig. 2, I have shown a cutter having its teeth so shaped that it is not necessary in cutting spur gears to set the axis of the cutter off at an angle equal to the angle of the helix of the cutter. This cutter is formed in a lathe by a tool the shape of whose cutting edge is symmetrical with respect to its axis and placed parallel with and moving parallel to the axis of the cutter, thereby producing a tooth which is symmetrical in the diametrical plane through the cutter and one in which the actual lead is also correct and in a plane parallel to the axis of the cutter, so that when used as it has been formed, it will produce symmetrical teeth in the blank to be cut. It has also the advantage of easing off or relieving the points and bases of the teeth, because in both of these cutters just described, the sides $d$ of the teeth are not formed of truncated wedges, but they are formed of reverse curves and shortened pitch so that the sides $d$ will relieve the teeth at the points as well as undercut them at the base, and thereby give the desired result of producing practically noiseless gears, that is, gears in which when two intermeshing teeth have their points of contact in their line of centers, the advancing and receding teeth will also be in slight contact and at this point, the strain exerted between the two gears will be divided in substantially the proportion of one half upon the two teeth in contact in the line of centers while the advancing and receding teeth will carry one quarter of the load. As the teeth advance, the pressure upon the receding teeth will gradually increase, but in a somewhat greater ratio, inasmuch as the teeth which have just been in line of centers are also now the receding pair and the pressure upon them is also gradually diminishing.

Referring now particularly to Fig. 4, a dotted section of rack teeth is drawn to represent a theoretically correct section of rack based on the accepted standard formula. The section of rack shown in full lines is one which has been modified in accordance with the invention. It should be noted that the difference between a theoretical rack and a modified rack is in that the cutting edges or sides of the teeth of the modified rack are concave with respect to their axes, whereas in the theoretical rack the sides are perfectly straight. The difference in result when using a hob cutter with curved cutting edges over one with straight cutting edges, can be readily seen from the resulting gear teeth shown, in which the dotted gear teeth section represents those produced by the theoretical rack and the gear teeth drawn in full lines, represent those produced by a rack having its cutting edges modified. The difference between these two results is obvious and resides in the fact that the points of the gear teeth are slightly rounded, gradually increasing in amount from the pitch line out. The bases are also undercut, gradually increasing in amount from the pitch line in.

Referring now to Fig. 5, in this figure the dotted section of rack teeth also represent a theoretical rack, and the dotted gear tooth curves, the resultant gear teeth. The rack teeth in full line have their cutting edges curved symmetrically with respect to their axes, and in addition have the normal circular pitch $c$ of less length than the theoretical pitch. By inspection of the drawing, it will be seen that by shortening the pitch and curving the cutting edges of the theoretical rack teeth, the points of the resulting gear teeth are relieved, and the bases undercut similar to that shown in Fig. 4, but with this exception, the shortening of the pitch of the rack teeth relieves the points of the teeth slightly more in proportion to the under cutting of the bases. This means that to obtain the same quietness in the running of the resultant gear teeth as that obtained by the cutter with curved edges only, as shown in Fig. 4, the cutting edges in Fig. 5 would not have to be curved quite so much because by shortening the pitch, the points would be relieved to a greater extent than the bases are undercut, and which would result in stronger teeth.

Claims.

1. A helical or hob cutter for generating gear teeth, having the cutting edges in a helical plane and symmetrical with their axes, said cutting edges curved to a degree differing from a theoretical straight sided rack tooth.

2. A helical or hob cutter for generating gear teeth, having the cutting edges in a helical plane and concaved with respect to their axes to a degree differing from a theoretical straight sided rack tooth.

3. A helical or hob cutter for generating gear teeth, having the cutting faces in a helical plane and symmetrical with their axes, said cutting faces concaved to a degree differing from the theoretical straight sided rack tooth, and the pitch of said helices slightly shorter than the theoretical pitch of a straight sided rack tooth.

4. A helical or hob cutter with cutting faces of equal curvature throughout their length and the sides of said cutting faces symmetrical with their axes in a plane normal to the helices of the cutter.

5. A helical or hob cutter with cutting faces of equal curvature throughout their length and of symmetrical contour in respect to their axes in a plane normal to the helices of said cutter, and the normal pitch of the helices of less length than the pitch of a theoretical straight sided rack tooth.

6. A helical or hob cutter with concaved cutting faces, symmetrical with respect to their axes in a plane normal to the helices of the cutter.

7. A helical or hob cutter, the cutting faces of which are in a helical plane and symmetrically concaved with respect to their axes in a plane normal to the helices, and the pitch of said helices slightly shorter than the pitch of a theoretical straight sided rack tooth.

This specification signed and witnessed this 22d day of January 1907.

WILLIAM F. ZIMMERMANN.

Witnesses:
Louis M. Sanders,
C. A. Alliston.